Patented July 19, 1949

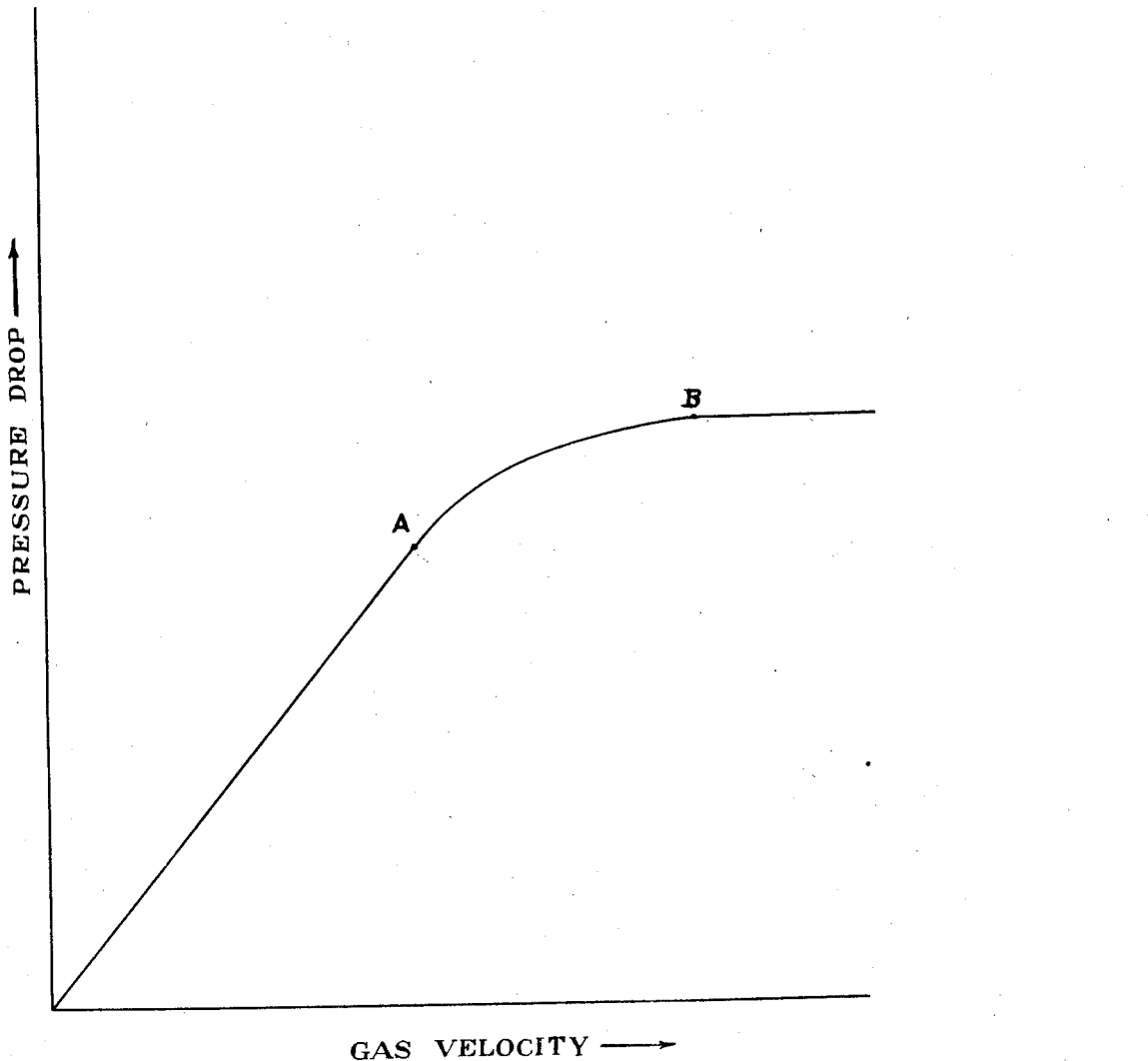

2,476,472

UNITED STATES PATENT OFFICE 2,476,472

SEPARATION OF ETHYLENE FROM GASEOUS MIXTURES

Michael H. M. Arnold and Donald Baxter, Norton-on-Tees, England, assignors to Imperial Chemical Industries Limited, a corporation of Great Britain Application November 2, 1944, Serial No. 561,642
In Great Britain August 30, 1943

7 Claims. (Cl. 183—114.2)

This invention relates to the removal by absorption of constituents contained in gaseous mixtures.

While the process of the invention can be used for the recovery of the vapours of normally liquid organic solvents such as carbon disulphide and chlorinated hydrocarbons contained in gaseous mixtures, it is particularly suitable for the removal of normally gaseous constituents from gaseous mixtures, for example, for the recovery of ethylene from gases obtained during the carbonisation of coal.

It is known to remove adsorbable constituents from gaseous mixtures containing them by the use of adsorbents such as charcoal, silica gel and alumina gel, an example of such a process being the removal of ethylene from coke-oven gas by means of active carbon. The gaseous mixture is first passed into contact with the adsorbent at a low temperature when the adsorbable material is substantially adsorbed and the other gases pass on substantially unadsorbed. The adsorbable material is then driven off from the adsorbent, usually by passing steam through the adsorbent. The stripped adsorbent is then freed from any water and cooled ready for adsorption again.

It has been proposed to carry out the process using stationary beds of adsorbent supported in suitable vessels. Since the adsorbent has to be subjected to alternate heating and cooling, considerable thermal energy is wasted in heating and cooling the material of the vessels, and several proposals have already been made to avoid this by carrying out the hot and cold stages of the process in separate vessels, and transferring the adsorbent from one vessel to another as required. In all these proposed methods, however, difficulties have been encountered in obtaining efficient scrubbing of the initial gases and efficient regeneration of the adsorbent.

We have now found an improved method of separating adsorbable material contained in gaseous mixtures by means of adsorbents, and using separate vessels for adsorption and desorption with transfer of the adsorbent from one vessel to the other, by means of which efficient scrubbing of the gaseous mixture and recovery of adsorbed material is achieved.

Referring to the drawing, when a stream of gas is passed in an upward direction through a bed of discrete particles, the pressure drop at first increases linearly with increase in the gas velocity. As the gas velocity is increased a critical point A is reached at which the pressure drop gas-velocity curve begins to inflect and the volume of the bed of discrete particles increases by approximately 10%. At this point the bed of discrete particles assumes some of the properties of a liquid, for example, the particles can be poured in a manner similar to liquids. Similarly, owing to the fact that the individual particles are cushioned by gas and the internal friction of the bed is thus greatly reduced, the bed can easily be stirred. If the gas velocity is further increased above this critical point, a point B is reached at which a motion similar to that observed on the surface of a boiling liquid is assumed by the particles, and for all gas velocities above this point the pressure drop is independent of the gas velocity. For all velocities above that denoted by A the bed retains the properties hereinbefore mentioned.

Hereinafter a bed of particles through which the gas velocity is of the value denoted by A or higher will be referred to as a fluid bed, while a bed of particles through which the gas velocity is between the points A and B will be more particularly referred to as an expanded bed, and a bed of particles through which the gas velocity is of the value denoted by B or higher will be more particularly referred to as a boiling bed.

According to the present invention there is provided a process for the removal of adsorbable constituents contained in gaseous mixtures by means of adsorbents, using separate vessels for adsorption and desorption with transfer of adsorbent from one vessel to another, in which a fluid bed as hereinbefore defined is employed in the adsorption stage and/or in the desorption stage.

More particularly the present invention provides a process of ethylene recovery from gaseous mixtures by means of adsorbents using separate vessels for adsorption and desorption with transfer of adsorbent from one vessel to the other, in which a fluid bed of adsorbent is employed in either the adsorption stage or the desorption stage or both.

When a fluid bed is used in the adsorption stage it is desirable for it to be an expanded bed working with a gas velocity as near as possible to the point A. The particles in the base of the adsorption bed are in contact with the incoming gas and are therefore richer in adsorbed material than those at the top of the bed which are in contact with the exit gas from which the adsorbable constituent or constituents has or have been substantially removed. Any of the particles which move upwardly in the bed therefore tend to lose to the gas some of the material they have already adsorbed. This undesirable tendency is minimised by working with as low a gas velocity as is compatible with the production of an expanded bed. However, when a fluid bed is used in the desorption stage, it is desirable for it to be a boiling bed in order to obtain the most efficient scrubbing of the particles and consequently the most efficient removal of the adsorbed material.

It is desirable for the adsorbent to have a high bulk density and to have as small a proportion of fines as possible. Large particle size of the adsorbent is advantageous, but since the gas velocity required to maintain a fluid bed and therefore also the pressure drop increases with increase in particle size, an upper limit is set in practical operation by the pressure drop which can be tolerated. The smallest particle size which can be tolerated depends on the nature of the adsorbent and gaseous mixture being treated. For example, in the adsorption of ethylene from coke-oven gas, using particles of a particular active carbon as the adsorbent, it was impossible to maintain a boiling bed when the particle size was $120\mu$ or less. Similarly the depth of the adsorbent bed should be as high as possible compatible with a practicable pressure drop. The following table shows the minimum gas velocities required to maintain a boiling bed with a given active carbon having various ranges or particle size, the gas velocities being measured above the boiling bed.

| Range of Particle Size | Gas Velocity: Cms./sec. |
|---|---|
| 150–180$\mu$ | 0.50 |
| 180–250$\mu$ | 2.75 |
| 250–500$\mu$ | 7.00 |

The liberation of the adsorbed material may be effected by any known means, for example, by passing steam through the adsorbent.

The water content of the adsorbent is important. When steam is used as the desorbing agent care should be taken to prevent the adsorbent from becoming so moist that the particles agglomerate and lose their free-flowing properties. Apart from this consideration, it is desirable for the moisture content of the adsorbent to be as low as possible in order to obtain the best adsorption efficiency, and for this purpose the adsorbent leaving the desorption stage should, if necessary, be stripped of moisture, for example, by passing through it a stream of hot inert gas, before it is cooled and returned to the adsorption vessel. Nitrogen or the gaseous mixture from which constituents have been stripped is suitable for this purpose.

We have found that by using steam with a high amount of superheat, the adsorbent is sufficiently dry for it to be directly cooled ready for use in the adsorption stage without employing an intermediate drying stage. For example, with active carbon, satisfactory desorption and substantially dry, desorbed carbon can be obtained by using steam at 200° C., at atmospheric pressure. The adsorbent may be cooled by any known means, preferably by passing a cold stream of inert gases, such as those used for the drying, through the adsorbent.

When the cooling stage is carried out by passing a gaseous stream through the adsorbent, the adsorbent may with advantage be maintained as a fluid bed and preferably as a boiling bed in this stage. Similarly where a drying stage is used employing a gaseous stream, the adsorbent is advantageously maintained as a fluid bed and preferably as a boiling bed.

All the stages, adsorption, desorption, drying where required, and cooling, may be carried out in separate vessels or alternatively the drying and cooling stages may be carried out in the same vessel.

Any known method of transferring the adsorbent from one stage to another may be employed, but those which produce the least breakage of the adsorbent particles are to be preferred.

*Example*

Coke oven gas containing 1.5% by volume of ethylene was passed, at a velocity of 3 cms. per second, through a bed of active carbon of particle size between $180\mu$ and $250\mu$ contained in a uniform cylindrical vessel, whereby a boiling bed was maintained. The gas velocity was measured above the boiling bed. The coke-oven gas was passed through the bed of carbon until the exit gas had the same composition as the inlet gas. The active carbon was then transferred to another vessel through which steam at a temperature of 300° C. was passed at a velocity of 5 cms. per second. The gases leaving the vessel were cooled to condense water vapour, whereby there was obtained a gas containing 41.8% by volume of ethylene. The active carbon was then cooled and returned to the adsorption stage ready for use in another cycle.

We claim:

1. In a process for the recovery of ethylene contained in gaseous mixtures, the steps of bringing the gaseous mixture into contact with an adsorbent in a vessel throughout which the said adsorbent moves unimpaired in a fluidized particulate state, subsequently transferring the said adsorbent to another vessel, and removing from the adsorbent at least a portion of the adsorbed ethylene, the adsorbent being maintained in the desorption stage as a boiling bed having a state of agitation higher than that of the adsorption bed.

2. In a process for the recovery of ethylene contained in gaseous mixtures, the steps of bringing the gaseous mixture into contact with active carbon in a vessel throughout which the said active carbon moves unimpaired in a fluidized particulate state, subsequently transferring the said active carbon to another vessel, and removing from the active carbon at least a portion of the adsorbed ethylene, the active carbon being maintained in the desorption stage as a boiling bed having a state of agitation higher than that of the adsorption bed.

3. In a process for the recovery of ethylene contained in gaseous mixtures, the steps of bringing the gaseous mixture into contact with active carbon in a vessel throughout which the said active carbon moves unimpaired in a fluidized particulate state, subsequently transferring the said active carbon to another vessel, and removing from the active carbon by treatment with a hot, inert vapor at least a portion of the adsorbed ethylene, the active carbon during both the adsorption and desorption steps being maintained as a boiling bed, said active carbon in said desorption bed having a higher state of agitation than the said carbon in the adsorption bed.

4. In a process for the recovery of ethylene contained in gaseous mixtures, the steps of bringing the gaseous mixture into contact with active carbon in a vessel throughout which the said active carbon moves unimpaired in a fluidized particulate state, subsequently transferring the said active carbon to another vessel, and removing from the active carbon by treatment with a hot, inert vapor, at least a portion of the adsorbed ethylene, the gas velocity during the adsorption step being not substantially higher than the minimum required to maintain the adsorbent as an expanded bed, the active carbon during the desorption step being maintained as a boiling bed.

5. In a process for the recovery of ethylene contained in gaseous mixtures, the steps of bringing the gaseous mixture into contact with active carbon having a particle size between $180\mu$ and $250\mu$ in a vessel throughout which the said active carbon moves unimpaired in a fluidized particulate state, subsequently transferring the said active carbon to another vessel, and removing from the active carbon at least a portion of the adsorbed ethylene, the adsorbent during the removal step being maintained as a boiling bed having a state of agitation higher than that of the adsorption bed.

6. In a process for the recovery of ethylene contained in gaseous mixtures, the steps of bringing the gaseous mixture into contact with active carbon in a vessel throughout which the said active carbon moves unimpaired in a fluidized particulate state, subsequently transferring the said active carbon to another vessel, and treating the active carbon with steam to remove at least a portion of the adsorbed ethylene, the active carbon during the adsorption step being maintained as an expanded bed, and during the removal of ethylene from the said active carbon, as a boiling bed.

7. In a process for the recovery of ethylene in gaseous mixtures, the steps of bringing the gaseous mixture into contact with active carbon in a vessel throughout which the said active carbon moves unimpaired in a fluidized particulate state, the velocity of the gaseous mixture being not substantially higher than the minimum required to maintain the active carbon as an expanded bed, subsequently transferring the said active carbon to another vessel, and treating the active carbon with steam to remove at least a portion of the adsorbed ethylene, the velocity of the steam being sufficient to maintain the active carbon as a boiling bed.

MICHAEL H. M. ARNOLD.
DONALD BAXTER.

REFERENCES CITED

The following references are of record in the file of this patent:

UNITED STATES PATENTS

| Number | Name | Date |
| --- | --- | --- |
| 1,422,007 | Soddy | July 4, 1922 |
| 1,836,301 | Bechthold | Dec. 15, 1931 |
| 1,872,080 | Harris | Aug. 16, 1932 |
| 2,270,903 | Rudbach | Jan. 27, 1942 |
| 2,327,175 | Conn | Aug. 17, 1943 |
| 2,337,684 | Scheineman | Dec. 28, 1943 |

FOREIGN PATENTS

| Number | Country | Date |
| --- | --- | --- |
| 146,332 | Great Britain | Apr. 21, 1921 |
| 569,691 | Great Britain | June 5, 1945 |